June 25, 1968 W. WIRZ 3,389,969

COUNTERCURRENT LIQUID-LIQUID EXTRACTION APPARATUS

Filed Feb. 10, 1965 2 Sheets-Sheet 1

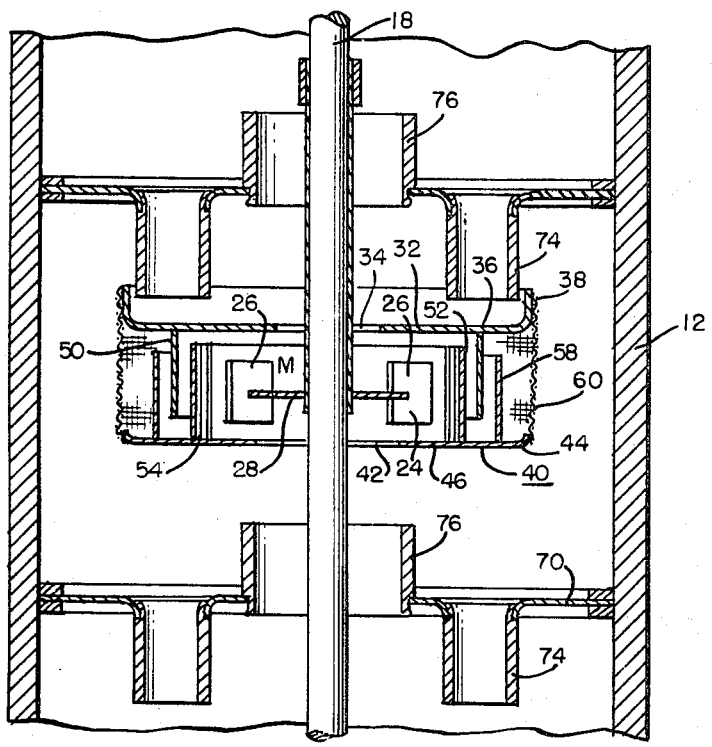
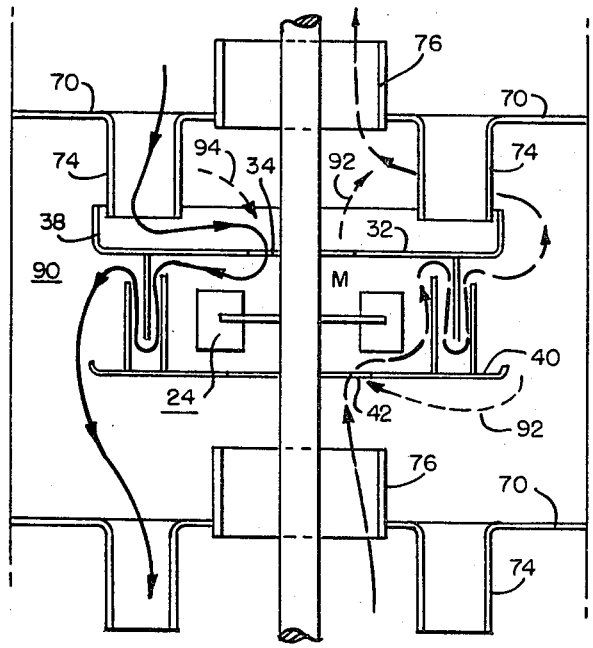

United States Patent Office 3,389,969
Patented June 25, 1968

3,389,969
COUNTERCURRENT LIQUID-LIQUID
EXTRACTION APPARATUS
Willi Wirz, Reinach, Basel-Land, Switzerland, assignor to
Hoffmann-La Roche Inc., Nutley, N.J., a corporation
of New Jersey
Filed Feb. 10, 1965, Ser. No. 431,581
Claims priority, application Switzerland, Feb. 18, 1964,
1,937/64
3 Claims. (Cl. 23—270.5)

ABSTRACT OF THE DISCLOSURE

An extraction column for countercurrent contacting of immiscible liquids comprising mixing chambers containing stirring blades mounted upon a rotable shaft and interfitting concentric annular baffles in planar relationship with the blades. In operation, the immiscible liquids to be separated are forced by the stirring blades through the interfitting concentric baffles.

Figure 1:
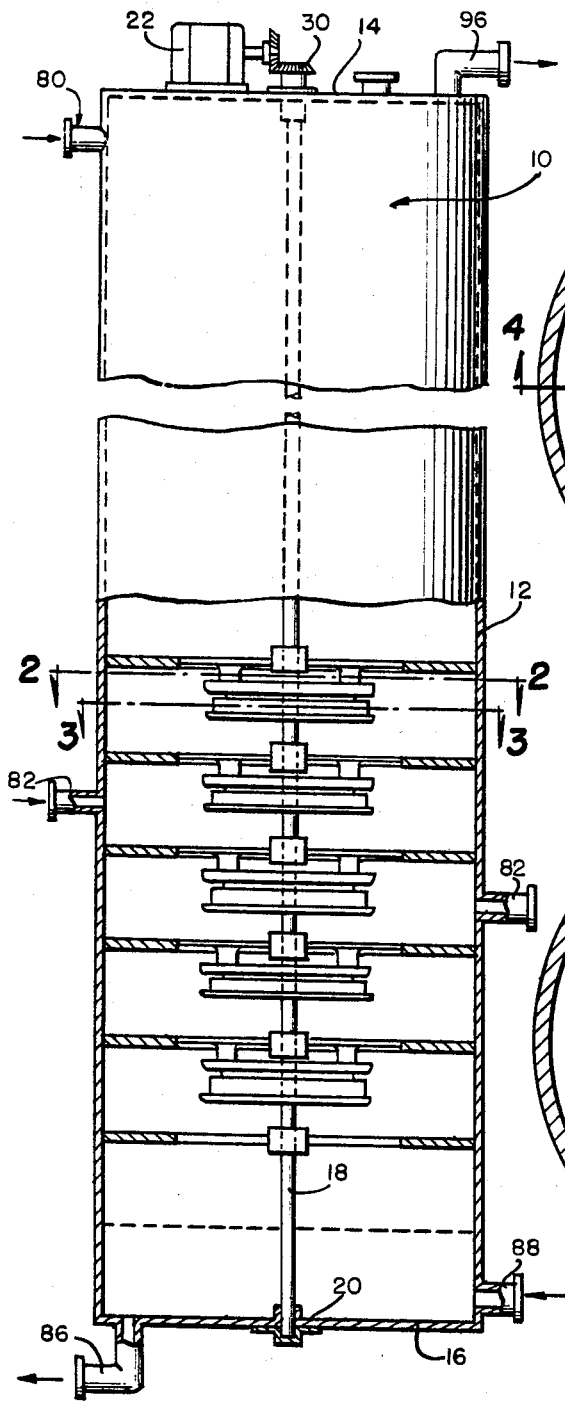

This invention relates to an improved apparatus for countercurrent contacting of immiscible liquids. More particularly, it relates to an improvement over the countercurrent solvent extraction column of the type shown in United States Patent 2,850,362 issued to E. G. Scheibel on Sept. 2, 1958.

In the exchange of material in liquid-liquid contact apparatus two incompatible portions of a process are required to be carried out, namely (1) an intensive mixing stage in which the liquids are caused to intermingle and an exchange of material is effected, e.g. a solvent extraction is performed and (2) a de-mixing or separation wherein a separation of the two liquids from one another is desired to be effected as completely as possible.

Various columns have been developed for accomplishing this mixing and de-mixing. For multistage liquid-liquid extractions, vertical columns in which energy for the intensive exchange of material between the two phases is applied with the aid of mechanical means have been found to be particularly suitable. The energy may be best brought in by rotating stirrers. Examples of this kind of apparatus are the above noted Scheibel extractor and others of a similar design.

As described in that patent, de-mixing of the liquid particules may be accomplished by providing special separation zones which, for example, can be produced by using wire gauzes or filling materials. After intensive mixing, the liquid particules are permitted to de-mix or separate from one another in these zones, on the basis of their differing density, and after the separation, the particles of similar composition can combine and flow together on the way to the next zone of agitation. The above Scheibel extractor is one which works according to this principle.

One recognized disadvantage of extraction systems of this type is that the column height necessary for the realization of a theoretical extraction stage rises with increasing diameter. In the technical solution of liquid-liquid material-exchange problems which necessitate a multiplicity of stages, this factor leads to apparatuses of considerable overall heights and correspondingly large layouts.

The principle object of the present invention is to provide an extraction column in which a high degree of extraction and large throughput can be achieved with small overall height.

An exemplary development of the column in accordance with the invention is described hereafter and is illustrated in the drawings accompanying this application, in which—

Figure 2:
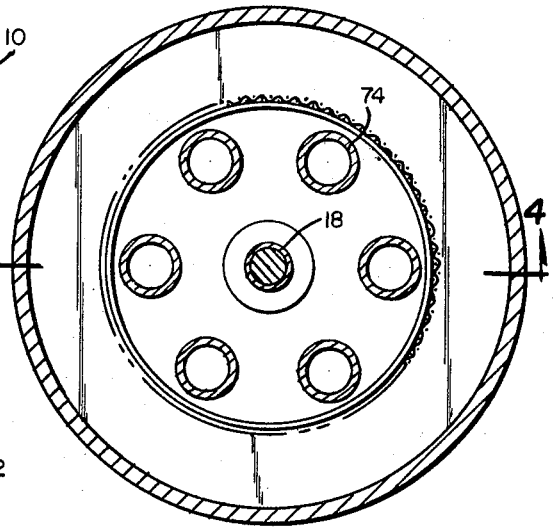
Figure 3:
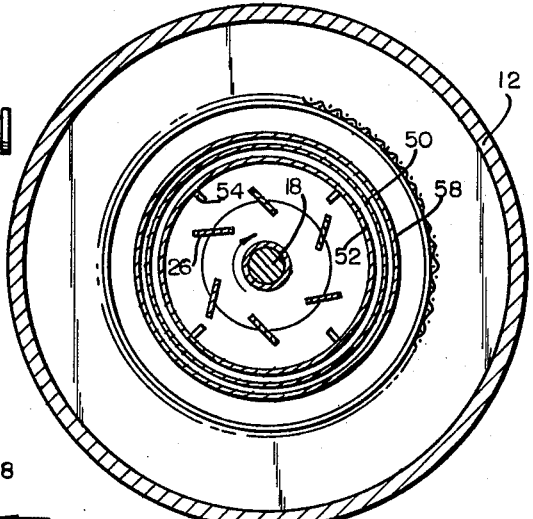

FIGURE 1 shows one embodiment of the invention in elevation and partly in section;
FIGURE 2 is a view in section taken along plane 2—2 of FIGURE 1;
FIGURE 3 is a view in section taken along plane 3—3 of FIGURE 1;
FIGURE 4 is a section view showing a single unit taken along plane 4—4 of FIGURE 2; and
FIGURE 5 is a schematic view showing the paths taken by the two liquids as they pass through the unit shown in FIGURE 4.

Referring to FIGURE 1, column 10 shown in partial cross section consists preferably of a vertical cylindrical shell 12 with a closed top 14 and bottom 16. Mounted centrally through the entire length of the extractor is a rotatable shaft 18 seated in bottom bearing 20. The shaft extends through a bearing in the top of the column for connection with a driving means 22. Mounted on the rotatable shaft, at spaced intervals, are horizontally extending stirrers or agitators 24. The stirrers are preferably turbine type agitators, i.e. vertical fins 26 mounted along the periphery of a rotatable horizontal plate 28. The number of fins on each agitator may vary. Two to eight, preferably six, agitator fins are conveniently used. The mixing fins or blades have no pitch so as to impart only horizontal flow to the liquid. Rotation of the agitators in each mixing section is effected by coupling the shaft 18 on which the agitators are mounted to a driving means such as motor 22 through a bevel gear 30. The column 10 is preferably divided into side by side mixing and calming sections, shown in greater detail in FIGURE 4.

FIGURE 4 shows the construction of one unit of the extraction column in accordance with the invention. The single rotating part, the stirrers 24, consists of the disc 28 with the stirring blades 26 and is mounted on the stirrer-shaft 18 in the centre of a fixed, cylindrical mixing chamber M. The mixing chamber is bounded by or defined by two floor plates. The upper floor plate 32 is provided with a centrally located opening 34 encompassing shaft 18 and consisting of a generally horizontal floor 36 and an upwardly extending annular lip 38 which is in the nature of a peripheral flange. The lower floor plate 40 is disposed parallel to the top floor plate, and it too has a central opening 42 encircling stirrer-shaft 18, opening 42 being optionally somewhat larger than opening 34. The lower floor plate has a generally flat base portion 46 and an annular lip 44 which is considerably smaller than lip 38. Floor plates 32 and 40 are preferably fitted with interlocking concentric annular baffles which leave transmission zones alternately above and below as shown. One baffle 50, consists of a ring extending downwardly from the bottom of the upper floor plate and terminating well above the top of lower floor plate 40. This baffle is located between two baffles extending upwardly from floor plate 40. The innermost annular ring 52 may be provided with an additional series of baffle plates 54 if necessary.

The floors 32 and 40 are fixed at a set distance to each other by cross-pieces (not shown) so that the three concentric baffles do not touch. The height of the innermost baffle 52 is somewhat larger than that of the outermost baffle 58 and as a consequence the clearance between the edge of the baffle and the floor plate it faces is least for inner baffle 52, and greatest for baffle 58.

The unit chamber shown in FIGURE 4 is bounded by a lower floor 70. Floor 70 is fixed tightly to wall 12 of the shell 10. Floor 70 is punched to provide support for any convenient number of symmetrically arranged exit pipes 74 and for a circular centrally located upward-directed entrance pipe 76 surrounding the stirrer shaft 18. The floors 32 and 40 are secured to the upper of adjacent pairs of floors or plates 70 by the said cross pieces. Thus, the upper of the adjacent pairs of floors or plates 70 is the top or ceiling of the unit and the lower of the adjacent pairs of floors or plates 70 is the bottom or floor of the unit.

The space between floor-plates 32 and 40 can be provided with one or more layers of wire-mesh gauze 60 wrapped around the periphery of the floor plates as indicated by the cross-hatching in FIGURE 2. Wire-mesh gauze can be held between the horizontally-extending floor plates 32 and 40.

Column 10 is provided with a port 80 located at the top and one or more supplemental inlet ports 82 located at one side, for the passage of any liquids as desired. Column 10 is also provided with an outlet 86 for the withdrawal of the heavier liquid after the process is completed. An inlet 88 at the base of the column admits the lighter liquid and a port 96 at the top of the column discharges the lighter liquid, or one of the supplemental ports 82 may be used for this purpose.

In FIGURE 5, the full line arrows on the left hand half of the figure shows diagrammatically the path followed by heavier liquid as it traverses one unit of the column and the broken arrows on the right hand half of the figure show diagrammatically the path followed by the lighter liquid in passing through the unit, the lighter arrows 92, 92' and 94' representing recirculation of liquids in the column as they are drawn into the mixing chamber by blades 26.

The column installations in accordance with the invention can be made from metal or from a synthetic material which is stable to solvent. The stirring-elements can also be manufactured from metal or synthetic material. The metallic stirrer-shaft can be encased with a synthetic material. The column itself can consist of glass beads, of sections of metallic tubing or of cylinders of synthetic material.

Assuming that the coherent phase in the column is formed from the light phase, the exchange of material in the extraction column in accordance with the invention proceeds as follows (see FIGURE 5):

The heavy phase which collects on the lower separating floor of the stage immediately succeeding above flows through the outlet tube 74 (FIG. 5) under the influence of the greater density. The collar 38 hinders the direct discharge of the phase into the settling space 90. The rotating stirrer 24 draws the surrounding liquid into the centre of the mixing chamber. As indicated by arrows in FIGURE 5, the whole of the heavy phase conducted from 74 (together with certain portions of the light phase) flows through the upper aperture 34. The light phase (with certain portions of the light phase from the settling space), conducted from the circular conduit 76 of the lower separating floor 70, flows through the aperture 42 of the lower floor-plate 40. The two additional portions 92, 92' of the light phase which are drawn into the mixing chamber from the setting space 90 result from the equilibrium between the resistance to flow of the quantity of liquid forced through the mixing elements and the energy brought in by the stirrers.

If the coherent phase in the column be formed from the heavy phase, the relationships are reversed thus:

The installations are vertically rotated through 180° so that the outflow pipes 74 point upwards. The heavy phase, together with certain portions 94 of the heavy phase from the settling space 90 which enter into the chamber above and below, flows through the outward directed, central circular conduit 76, whilst the whole of the light phase is led through the pipe 74 via the concentric aperture 34 of the mixing chamber. In this case the separating layer lies above.

The two phases which are drawn in are intimately mixed with one another in the mixing chamber (which may be reinforced by baffle-plates) and subsequently forced through the labyrinth of the baffles towards the periphery of the mixing chamber. The resistance to flow is minimized by the optionally enlarged transmission zones of the outer baffles.

On the way to the settling zone 90 the issuing phases can be led through a wire-mesh guaze (FIG. 4) which promotes the merging of small droplets into larger ones.

Where the heavy phase is dispersed, the combined heavy drops sink on to the separating floor 70, flow together and are conducted as a homogeneous stream of liquid to the stage which follows immediately below. When the light phase is dispersed, in which case the installations are vertically rotated through 180°, the large drops which are combined in the wiremesh gauze stream on to the roof of the seperating floor which lies above and thence through the pipes 74 into the immediately following mixing chamber.

The calm outflow of the large drops from the mixing chamber results in the separation of the phases in the settling space being so good that even solvents whose density differs by less than 0.05 g./cm.$^3$ can be used.

The efficiency of the extraction column in accordance with the invention can be illustrated by the following data:

EXPERIMENTAL DETAILS

Extraction column:
  Diameter—500 mm.
  Number of exchange elements—3
  Clearance of the separating floors—100 mm.
Speed of rotation of the stirrer shaft—360 r.p.m.
Inflow per hour:
  (a) 40 kg. of propionic acid in 920 kg. of toluene
  (b) 670 kg. of water
Temperature—20° C.

EXPERIMENTAL RESULT

Theoretical steps _____ 2.58
Theoretical number of steps/m. _____ 8.6
Spec. throughput dm.$^3$/dm.$^2$ h. _____ 88
Efficiency coefficient in steps/h.[1] _____ 75

[1] I. I. Ponikarov et al., Int. Chem. Engng. (1962) 2, 546.

From the foregoing it will be seen that the extraction column in accordance with the invention has different inlet and outlet pipes for the inflow and discharge of the liquid in countercurrent and that it consists of a plurality of individual exchange elements, a stirrer-shaft rotatable in the column axis with circular stirring-blade discs which are symmetricaly provided at the periphery with vertical stirring-blades, and a means for driving the stirrer-shaft and elements connected thereto. It is especially characterised in that each exchange element consists of a centrally arranged cylindrical mixing chamber (fitted with a stirring-blade disc at the centre) which is held at a set distance from the wall of the column and is made up of a horizontal upper floor plate with a concentric collar and a central concentric aperture and of a horizontal lower floor plate with a central concentric aperture and which is equipped between these two floors with several vertical, interlocking, concentric baffles with liquid transmission zones alternately above and below, as well as with baffle plates and is connected by cross-pieces with a terminal horizontal separating floor which is arranged above the mixing chamber, secured to the wall of the column, and which carries several downward extending pipes which discharge into the collar of the upper floor plate of the mixing chamber, and a collar shaped concentric, upward directed entrance aperture.

By the enforced course of the liquid (which hinders back-mixing and back-diffusion) and because the intensively acting mixing elements are consequently separated from the settling zones, the overall height necessary for the realization of a theoretical exchange stage is successfully kept low and almost independent of the cross-section required by the throughput.

Other solutions are also conceivable as, in general, the exchange elements in accordance with the invention are in no way limited by the embodiment here described but extensive scope for variants with the same principle is left open.

I claim:

1. A liquid-liquid extraction apparatus comprising a vertically elongated extraction column divided into a plurality of individual separate sections by flat horizontal plates positioned at verticaly spaced intervals along and extending outwardly to the interior wall of the column, adjacent pairs of said plates separating the column into said individual sections in which mixing and separation of two liquids are effected, each plate having a central aperture, an upstanding collar means disposed about said aperture and a plurality of attached downwardly extending downcomer pipes on the lower side of each plate and arranged about said aperture, a mixing-settling unit disposed within each of said sections, each of said units including a horizontal upper plate means spaced inwardly from said column wall and provided with a central aperture, said upper plate means extending beyond said downcomer pipes and having upstanding flange means about its outer circumference, each of said units further including a horizontal lower floor plate means having a central aperture; a centrally located rotatable shaft extending vertically through the column, vertical blade agitators mounted on said shaft and extending radially into the space confined between said upper and said lower floor plate means, a plurality of vertical interfitting concentric baffles disposed between the said upper plate means and the said floor plate means and extending alternatively upwardly from said lower floor plate means and downwardly from said upper plate means to provide hollow transmission zones alternatively above and below said baffles, light liquid outlet means and heavy liquid inlet means in the top portion of said column, light liquid inlet means and heavy liquid outlet means in the bottom portion of said column.

2. The liquid-liquid extraction apparatus as defined in claim 1 in which the distance between the edges of the vertical interfitting baffles and the floor plate means which it faces increases from one baffle to the next, proceeding from the innermost baffle outwardly and radially from said rotatable shaft.

3. A liquid-liquid extraction apparatus as defined in claim 1 including additional means to assist in the separation of the mixed liquids after mixing, said means comprising a wire gauze wrapped around and attached to the outer circumference of said upper and lower floor plate means.

References Cited
UNITED STATES PATENTS

| | | | |
|---|---|---|---|
| 2,776,305 | 1/1957 | Habicht | 23—310 X |
| 2,847,283 | 8/1958 | Figg | 23—270.5 |
| 2,850,362 | 9/1958 | Scheibel | 23—270.5 |
| 2,941,872 | 6/1960 | Pilo | 23—270.5 |
| 3,032,403 | 5/1962 | Kohl | 23—270.5 |

NORMAN YUDKOFF, *Primary Examiner.*

WILBUR L. BASCOMB, Jr., *Examiner.*

S. EMERY, *Assistant Examiner.*